July 16, 1957  T. H. THOMAS  2,799,372
NO-CREEP BRAKE CONTROL MECHANISM
Filed March 17, 1954  2 Sheets-Sheet 2

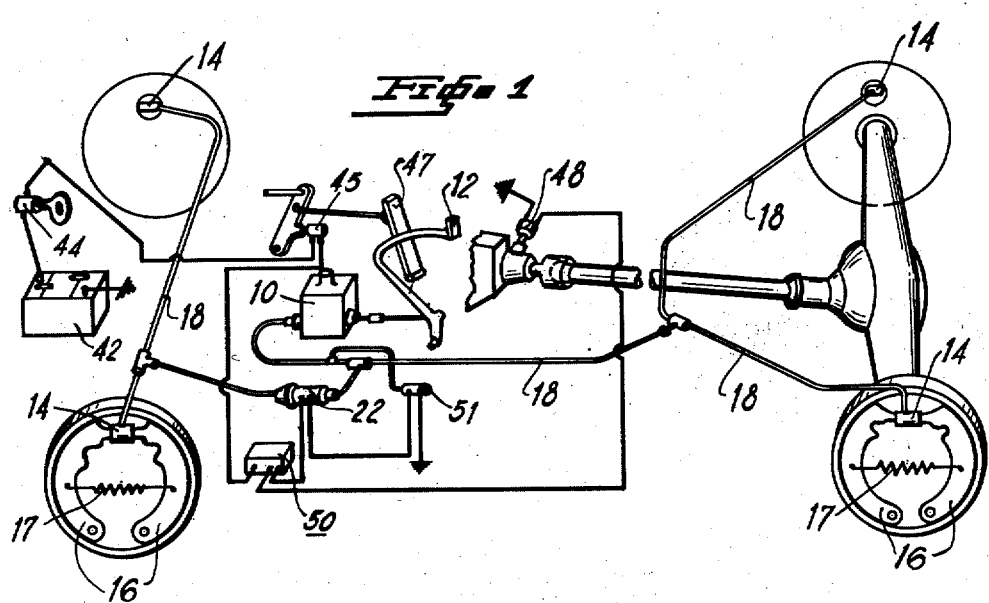
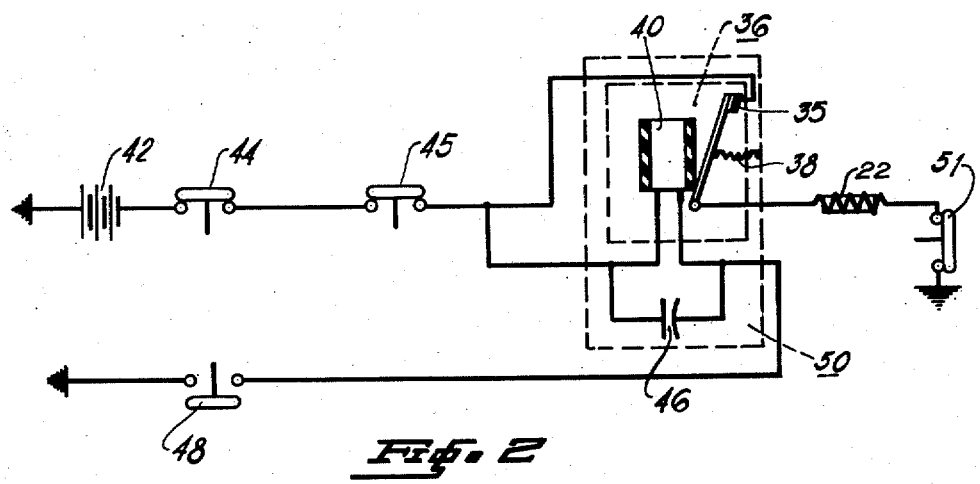

INVENTOR.
THOMAS H. THOMAS
BY
*H. O. Clayton*
ATTORNEY

United States Patent Office 2,799,372
Patented July 16, 1957

2,799,372
NO-CREEP BRAKE CONTROL MECHANISM

Thomas H. Thomas, South Bend, Ind., assignor to Bendix Aviation Corporation, South Bend, Ind., a corporation of Delaware Application March 17, 1954, Serial No. 416,823

4 Claims. (Cl. 192—3)

This invention relates in general to brake mechanisms for vehicles and in particular to an anti-creep brake mechanism for an automotive vehicle.

Anti-creep brake mechanism for vehicles, particularly automotive vehicles, usually include a vehicle speed responsive control means, such as a vehicle speed responsive governor operated switch, operative, together with the remainder of the anti-creep mechanism, to hold the brakes of the vehicle applied after the brakes have been applied and when the car is moving at a relatively low speed, say 2 M. P. H.

However, it has been found from experience that many drivers learn to depend upon the creep speed of the car to aid in parking; and the coast of the car is often used in a maneuvering operation, the coast being snubbed by an operation of the brakes as an obstruction is approached. When the car equipped with an anti-creep mechanism of the above type one snubbing action results in a continued brake application rather than leaving the brakes under the control of the driver. However, if the car is not so equipped a number of snubbing and releasing actions may be made before a dead stop is obtained.

Accordingly, it is an object of my invention to incorporate, in a vehicle anti-creep brake mechanism, manually controlled means operable incidental to certain operations of the controls of the vehicle, for so controlling the anti-creep mechanism as to temporarily disable the same when the aforementioned operating conditions make such a disabling operation desirable. In one embodiment of my invention the anti-creep mechanism is temporarily disabled, to facilitate parking of the vehicle, when the manually operated selector lever of the transmission is placed in either its low or reverse setting; and in another embodiment of my invention the anti-creep mechanism is temporarily disabled for the same purpose when the brakes are only lightly applied whereas the mechanism is permitted to operate normally if the brakes are applied more firmly.

The above and other objects and features of the invention will appear more fully hereinafter from a consideration of the following description taken in connection with the accompanying drawings where two embodiments of the invention are illustrated by way of example.

Figure 3:
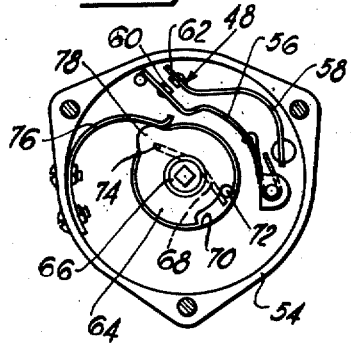
Figure 4:
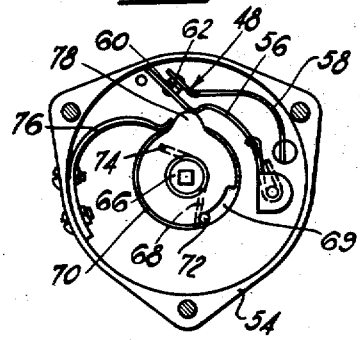
Figure 5:
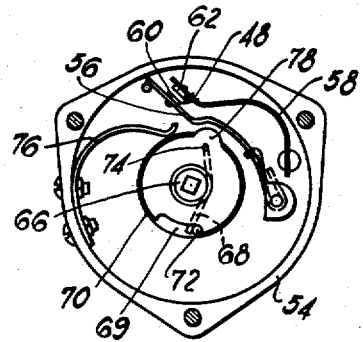
Figure 6:
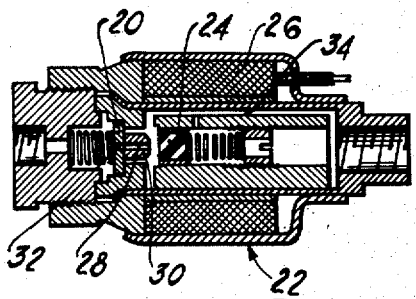
Figure 7:
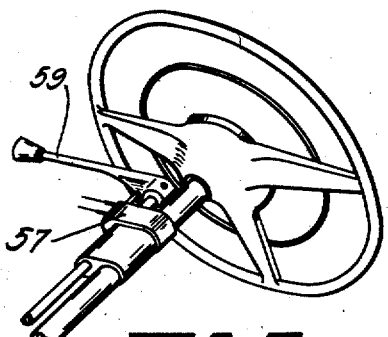

Figure 1 is a diagrammatic view disclosing one embodiment of my invention employed as a part of the anti-creep mechanism of an automotive vehicle;

Figure 2 discloses the electrical hookup of the mechanism of Figure 1;

Figures 3, 4 and 5 disclose details of the speed responsive breaker switch mechanism used in my invention, the switch operating means thereof being shown in several of its operative positions;

Figure 6 is a sectional view disclosing details of the solenoid operated check valve of the mechanism of Figure 1; and Figure 7 discloses another embodiment of my invention wherein the anti-creep mechanism is disabled by an operation of the shift lever of the car.

There is disclosed in Figures 1 and 2 a preferred embodiment of my invention wherein the switch controlling mechanism of my invention is employed to control a well known type of brake mechanism of an automotive vehicle said mechanism including the anti-creep mechanism constituting my invention. This brake and anti-creep mechanism includes a master cylinder 10 housing a piston, not shown, which is actuated as a result of the manual operation of a brake pedal 12. Depressing the brake pedal to apply the brake energizes wheel cylinders 14 which in turn actuate the brake shoes 16 of the wheel brakes of the vehicle. In this operation an incompressible or substantially incompressible brake fluid flows through conduits 18 and upon release of the brake pedal a certain mechanism including return springs 17, operates to return the parts of the mechanism to their brake off positions.

Briefly describing the anti-creep mechanism a solenoid operated check valve 20, Figure 6, preferably inserted in the system to control the front brakes of the vehicle, operates, with a release of the brake pedal and after the energization of a grounded solenoid 22, to trap the brake fluid between the wheel cylinders and said valve, thereby holding the brakes in their applied position; however, said solenoid when deenergized serves to disable this valve and thereby disable the anti-creep mechanism. Describing the latter operation a spring loaded yieldable cut off valve member 24, housed within the armature 26 of the solenoid, is spaced from an opening 28 in the pole piece 30 of the solenoid thereby making it possible for the brake fluid to return through an opening 32 in the check valve, the opening 28, and thence through a recess 34 in the armature 26 and on toward the master cylinder 10.

Describing now the switch control means of Figures 1 and 2 there is provided a normally closed switch 35 of a relay 36; and this switch is preferably biased to its closed position by a spring 38. The coil 40 of the relay is electrically connected in series with a grounded battery 42, the ignition switch 44 of the vehicle, an accelerator operated switch 45 which is closed only when the accelerator 47 of the car is in its released position, and a grounded vehicle speed responsive breaker switch 48 which is opened when the car is brought to a stop. No claim is made to the latter switch inasmuch as the same is the invention to James K. Tom and is disclosed in the U. S. application for patent, Serial No. 202,714, filed December 26, 1950. A condenser 46 is electrically connected in parallel with the relay coil 40 in the aforementioned electrical circuit including the battery, the ignition switch, the accelerator operated switch and the breaker switch. The relay 36 and condenser 46 may be housed within one container indicated by the reference numeral 50 in Figures 1 and 2.

The parts of the mechanism of Figure 1, particularly the condenser 46 and the rate of charge thereof, are preferably so constructed and arranged and so operative that the anti-creep mechanism is rendered operative at the beginning of a certain period of time before the vehicle comes to a stop. An inspection of the electrical hook-up of Figure 2 and an inspection of the switch mechanism 48 of Figures 3, 4 and 5 reveals the operation of the mechanism to effect this result inasmuch as the condenser 46 is electrically connected in parallel with the relay coil 40. As to the four-wheel brake mechanism of Figure 1, it is to be particularly noted that the anti-creep portion of this mechanism is operative to control only the two front wheel brakes and that the means for controlling the anti-creep mechanism, including the condenser 46, is responsive to the speed of rotation of the two rear wheels of the vehicle.

As to the remainder of the electrical circuit for controlling the operation of the solenoid of the anti-creep mechanism said circuit includes, in series with solenoid 22, a normally open brake pedal actuated hydraulically operated pressure switch 51, the normally closed relay switch 35, the accelerator operated breaker switch 45, the ignition switch 44, and the grounded battery 42. The accelerator operated breaker switch 45 is not disclosed in detail inasmuch as no claim is made thereto the same being of any of the well known design of such a switch. This switch 45 is closed when the accelerator is in its released position.

As to the normally open switch 51 this switch, preferably a stop light type of hydraulic pressure switch of any well known make, constitutes the most important feature of my invention; for this pressure switch is so constructed that a relatively light manual application of the brake pedal, say an application effecting a pressure of the brake fluid of less than 100 p. s. i. will not close the switch. It follows therefore, that with such a light application of the brake pedal, say when maneuvering the car at a low vehicle speed or in the act of parking the car, there will be no operation of the anti-creep mechanism to hold the brakes once they are applied. The driver, with such a light application of the brakes, may, as stated above, effect a snubbing operation of the car. However, should the driver depress the brake pedal with a load effecting a hydraulic pressure in the brake system of over 100 p. s. i., then the pressure switch 51 will be closed resulting in bringing the brake anti-creep mechanism into operation and preventing the aforementioned snubbing operation of the vehicle.

Describing now the speed responsive breaker switch 48 disclosed in Figures 3, 4, and 5 this switch includes a casing 54 to which are secured flexible switch contact arms 56 and 58, switch contacts 60 and 62 being mounted on the ends of said arms respectively. A disc shaped switch operating cam member 64 is rotatably mounted on a switch drive shaft 66 the two being yieldably connected by means of a torque spring 68 sleeved over the shaft and lying between the cam 64 and a flange 70 fixedly connected to the shaft. One end of the spring 68 abuts a drive pin 72 which extends laterally from the face of the flange 70 and within a recess 69 in the cam; and the other end of the spring extends within an opening 74 in the cam. The torque spring serves to rotate the cam in the same direction as the switch drive shaft normally rotates; and a leaf spring 76 of sufficient tension is mounted on the switch casing and serves to arrest the movement of the cam once per revolution while the drive shaft continues its rotation and its operation of loading the torque spring. As the drive shaft overruns the cam, say a one-eighth turn to the position disclosed in Figure 4, said shaft and cam rotate as one and force a cam lug 78 past the leaf spring. Immediately thereafter, the torque spring causes the cam to overrun the drive shaft one-eighth turn to its original and normal position the parts being then in the position disclosed in Figure 5.

During the overrun operation the cam lug 78 serves to move the flexible switch arm 56 toward the arm 58 thereby closing the switch contacts 60 and 62 momentarily. The switch arm 56 is so placed that even though the drive shaft should stop its movement simultaneously with release of the cam lug from the leaf spring 76 said lug will nevertheless ride past the switch arm and will never hold the switch contacts closed for more than an instant. The drive shaft 66 is preferably drivably connected to the speedometer cable of the vehicle and the parts of the mechanism are preferably so constructed and arranged that the relay 36 is energized and deenergized and the condenser 46 is charged approximately 1,000 times per mile of travel of the vehicle.

Describing now in brief an operation of the embodiment of my invention disclosed in Figures 1 and 2 the anti-creep mechanism is rendered inoperative when the car is in motion above a certain low speed; this for the reason that the relay switch 35 is held open by an operation of the breaker switch and the condenser thereby rendering the check valve 20 inoperative to trap the brake fluid in the slave cylinders. However at the end of a certain period of time after the car speed is reduced to the aforementioned low value, that is the period during which the condenser is in its process of discharging, the switch 35 is automatically closed by an operation of the spring 38 thereby effecting an energization of the solenoid 22 to render the anti-creep mechanism operative. The anti-creep mechanism is also rendered inoperative by the normally open switch 51, said switch being closed to render the mechanism operative, only when the brake pedal is depressed by a force exceeding the aforementioned certain value.

There is disclosed in Figure 7 another embodiment of my invention wherein the anti-creep mechanism is disabled by a certain operation of the transmission of the vehicle. In this embodiment a normally closed switch 57, in series with the grounded solenoid 22, the switches 35, 45 and 44 and the grounded battery 42, is opened, to temporarily disable the anti-creep mechanism, when a transmission controlling shift lever 59 is positioned in either of its low or reverse settings. In all other settings of the transmission the anti-creep mechanism is operative. The aforementioned solenoid, battery and three switches are not disclosed in Figure 7 this being unnecessary in view of the showing of the electrical circuit in Figures 1 and 2; for the switch merely takes the place of the switch 51 of Figures 1 and 2. A disabling of the anti-creep mechanism is desirable when the transmission is established in either its low or reverse settings; for the transmission is usually in one or the other of those settings when the car is being maneuvered to a parked position. The shift lever 59 is preferably conveniently mounted beneath the steering wheel 61 of the car.

There is thus provided, by the brake anti-creep control mechanism of my invention, a manually controlled mechanism, such as the brake pedal operated hydraulic switch 51 or the shift lever operated switch 57, operative, at the will of the driver of the vehicle, to disable the normal anti-creep operation of the mechanism when the driver desires to park his car or when the driver snubs the movement of the car with a light application of the brakes.

I claim:

1. In a vehicle provided with a plurality of brakes, mechanism for operating the brakes including a brake pedal and a brake holding mechanism which may be operative, provided the vehicle is traveling at or below a certain speed, to hold the brakes applied once they are applied, and means for controlling the operation of the latter mechanism including brake pedal controlled means operable, when the pedal is depressed with a certain force, to render said mechanism operative.

2. In a vehicle provided with a plurality of brakes, hydraulic mechanism for operating the brakes including a brake pedal and a brake holding mechanism which may be operative, provided the vehicle is traveling at or below a certain speed, to hold the brakes applied once they are applied, said brake holding mechanism including a check valve, a cut off valve cooperating with said check valve, and a solenoid for operating said cut off valve; and means for controlling the operation of the latter mechanism including brake pedal controlled normally open switch means operable, when the pedal is depressed with a certain force to render the brake holding mechanism operative.

3. In a braking system for an automotive vehicle having an accelerator pedal, a brake, a fluid pressure motor operating said brake, fluid pressurizing means connected to said motor for applying said brake, an electrically operated valve for holding pressure existing in said motor when said electrically operated valve is energized, an electrical supply circuit for said electrically operated valve, a first member for operating said pressurizing means and applying said brake when in a brake actuating position, a transmission providing a forward and a reverse drive for the vehicle, a second member for placing said transmission in its reverse drive condition when said second member is in a reverse actuating position, a first control switch in said electrical supply circuit which is opened upon depressing said accelerator pedal, and a second control switch in said supply circuit connected in series with respect to said first control switch, said second switch being actuated by one of said members to open said switch when in its aforementioned actuating position, whereby energization of said electrically operated valve is required to hold the brakes applied, and energization of said valve is automatically prevented by an open switch during the usual parking operation.

4. In a braking system for an automotive vehicle having an accelerator pedal, a brake, a fluid pressure motor operating said brake, fluid pressurizing means connected to said motor for applying said brake, an electrically operated valve for holding pressure existing in said motor when said electrically operated valve is energized, an electrical supply circuit for said electrically operated valve, a first member for operating said pressurizing means and applying said brake when in a brake actuating position, a transmission providing a forward and a reverse drive for the vehicle, a second member for placing said transmission in its reverse drive condition when said second member is in a reverse actuating position, a first control switch in said electrical supply circuit when is opened upon depressing said accelerator pedal, and a second control switch in said supply circuit connected in series with respect to said first control switch, said second switch being actuated by said second member to open said switch when in its aforementioned reverse actuating position, whereby energization of said electrically operated valve is required to hold the brakes applied, and energization of said valve is automatically prevented by an open switch during the usual parking operation.

References Cited in the file of this patent

UNITED STATES PATENTS

| | | |
|---|---|---|
| 2,262,842 | Goepfrich | Nov. 18, 1941 |
| 2,313,430 | Goepfrich | Mar. 9, 1943 |
| 2,489,929 | Raybould | Nov. 29, 1949 |
| 2,638,118 | Chandler | May 12, 1953 |
| 2,642,484 | Price | June 16, 1953 |

UNITED STATES PATENT OFFICE

CERTIFICATE OF CORRECTION

Patent No. 2,799,372                                                      July 16, 1957

Thomas H. Thomas

It is hereby certified that error appears in the printed specification of the above numbered patent requiring correction and that the said Letters Patent should read as corrected below.

Column 2, line 44, for "invention to" read -- invention of --; column 4, line 65, after "force" insert a comma; column 6, line 6, for "when" read -- which --.

Signed and sealed this 14th day of January 1958.

(SEAL)
Attest:

KARL H. AXLINE                                                  ROBERT C. WATSON
Attesting Officer                                           Commissioner of Patents